United States Patent [19]
Ziegler

[11] 3,972,471
[45] Aug. 3, 1976

[54] AUTOMATIC TEMPERATURE SETBACK SYSTEM FOR CONTROLLING A HEATING UNIT

[76] Inventor: Ronald N. Ziegler, P.O. Box 3243, Wescosville, Pa. 18106

[22] Filed: May 27, 1975

[21] Appl. No.: 581,285

[52] U.S. Cl. .............................. 236/46 R; 236/51; 236/68 B; 307/3; 340/310 A
[51] Int. Cl.² ........................................ G05D 23/30
[58] Field of Search ............... 236/46, 47, 68 B, 51; 219/511; 340/310; 307/3; 165/12

[56] References Cited
UNITED STATES PATENTS

| | | | |
|---|---|---|---|
| 2,604,267 | 7/1952 | Smith | 236/46 |
| 2,642,228 | 6/1953 | Machlet | 236/68 B |
| 3,544,766 | 12/1970 | Muskovac | 219/511 X |
| 3,834,618 | 9/1974 | Buckwalter | 236/46 |

Primary Examiner—William E. Wayner
Attorney, Agent, or Firm—Fred Fisher

[57] ABSTRACT

An automatic temperature setback system for controlling a heating unit includes the use of two devices. One device includes a oscillator circuit which is actuated by a timer control. The oscillator circuit can be an astable or free-running multivibrator. The output from such device is coupled across the low voltage secondary transformer winding of a typical heating system control unit so that, at specific timed intervals, the low voltage (i.e., 24 volts RMS) can have high frequency modulations superimposed upon either the positive cycles of such voltage or alternatively the negative cycles or alternatively both cycles. Such one device could be termed, in general, means for half-wave modulating the low alternating voltage carrier from a typical heating system control unit. The low voltage wires from the typical heating system control unit, in a conventional household, are coupled through the house to a low voltage thermostat located in one of the rooms of the house. The second device of the system includes a module, herein termed a thermostat module, which is activated by the modulation in the low voltage wires which are coupled to the thermostat. The thermostat module provides an output across a heating resistor which is placed in proximity to the low voltage thermostat to influence the thermostat when the first named device is operative. The second device can generally be termed a means for demodulating such modulation to provide current to flow through a heating resistor which is in proximity to the thermostat. The second device can include a separate switch for deactivating or activating such module, wherein such switch is coupled to one of the low voltage leads. The opposite end of the switch is coupled through the heating resistor and through a variable potentiometer to the anode of a silicon controlled rectifier (SCR). The cathode of the SCR is coupled to the other lead of the low voltage supply. A capacitor is coupled across the anode and the gate electrode of the SCR. A resistor couples the gate electrode and the cathode of the SCR. The capacitor is of such a value as to be of low impedance to the modulated signal. Desirably, a serial connected resistor and a light emitting diode are coupled between the switch and the anode of the SCR so that, when the second device is operative the light emitting diode glows to indicate that the thermostat module is functioning.

21 Claims, 14 Drawing Figures

AUTOMATIC TEMPERATURE SETBACK SYSTEM FOR CONTROLLING A HEATING UNIT

BACKGROUND OF THE INVENTION

1. Field of the Invention

This invention relates to an automatic temperature setback system for controlling a heating unit. Accordingly, the general objects of this invention are to provide new and improved devices and methods of such character.

2. Description of the Prior Art

In accordance with a preliminary novelty search performed on behalf of the applicant, the following U.S. patents were deemed to be of possible interest:

| U.S. Pat. No. | Patentee | Issue Date |
| --- | --- | --- |
| 2,632,086 | Hagen | March 17, 1953 |
| 2,642,228 | Machlet | June 16, 1953 |
| 2,842,345 | Brown | July 8, 1958 |
| 2,984,729 | Hykes et al | May 16, 1961 |
| 3,231,719 | DeViney et al | Jan. 25, 1966 |
| 3,240,916 | Bray et al | March 15, 1966 |
| 3,243,609 | Kompelien | March 29, 1966 |
| 3,283,179 | Carlisle et al | Nov. 1, 1966 |
| 3,305,766 | Gambill | Feb. 21, 1967 |
| 3,326,275 | Ray | June 20, 1967 |
| 3,334,244 | Hanchett | Aug. 1, 1967 |
| 3,335,263 | Jewell et al | Aug. 8, 1967 |
| 3,341,769 | Grant | Sept. 12, 1967 |
| 3,356,784 | Bertioli et al | March 5, 1967 |
| 3,371,191 | Seney | Feb. 27, 1968 |
| 3,401,880 | Verden | Sept. 17, 1968 |
| 3,419,214 | Evalds | Dec. 31, 1968 |
| 3,421,691 | Forbes | Jan. 14, 1969 |
| 3,544,766 | Muskovac | Dec. 1, 1970 |
| 3,584,988 | Hirsbrunner et al | June 15, 1971 |
| 3,588,448 | Ziver | June 28, 1971 |
| 3,600,118 | Hirsbrunner | Aug. 17, 1971 |
| 3,670,960 | Chambers | June 20, 1972 |
| 3,749,884 | Detmann et al | July 31, 1973 |
| 3,767,936 | Sweger | Oct. 23, 1973 |
| 3,834,618 | Buckwalter | Sept. 10, 1974 |

The foregoing patents are cited to aid the Patent and Trademark Office in the examination of this invention, such art being that known to the applicant, and for the following reasons:

Hagen, U.S. Pat. No. 2,632,086, discloses an oscillator used in the control of a heating element, such as an electric blanket.

Machlet, U.S. Pat. No. 2,642,228, discloses an apparatus which can respond to heat and uses an oscillator and carrier wave control. The circuit diagram of FIG. 4 of Machlet includes an oscillator-thermostatic element which, via a transformer, is puggable into a conventional power line of a home. A remote unit located near the burner, as also pluggable into the power line, acts as a carrier wave amplifier and detector for closing relay contacts for providing electrical power to the burner when the oscillator-thermostatic element combination is operative. Machlet terms such apparatus as a "wired radio" control of an oil burner.

Brown, U.S. Pat. No. 2,842,345, utilizes gas discharge tubes in a controller to control the heating of a resistor.

Hykes et al., U.S. Pat. No. 2,984,729, discloses a multivibrator used in a heating control for an oven.

DeViney et al., U.S. Pat. No. 3,231,719, discloses a multivibrator and a controlled rectifier firing to control a heating resistor.

Bray et al., U.S. Pat. No. 3,240,916, and Sweger, U.S. Pat. No. 3,767,936, show anticipator circuits with a silicon controlled rectifier (SCR) controlling the heating of a load.

Gambill, U.S. Pat. No. 3,305,766, is included as of interest for the plurality of SCRs, shown in his FIG. 6, utilized in a full wave voltage control system for heating loads.

Jewell et al., U.S. Pat. No. 3,335,263, discloses temperature control equipment with an astable multivibrator circuit which is used for controlling the temperature of a furnace.

Grant, U.S. Pat. No. 3,341,769, discloses circuitry for use in temperature sensitive systems including an oscillator with pulsing to an SCR and modulating alternating current. By making one or more of the resistances of a Wheatstone bridge, shown in Grant, temperature sensitive, as for example in thermometric systems, the power delivered may be made proportional to the temperature in the ambient environment to which the temperature sensitive resistor is exposed.

Bertioli et al., U.S. Pat. No. 3,356,784, discloses temperature control circuitry with circuitry including multivibrators to controlled rectifiers.

Seney, U.S. Pat. No. 3,371,191, discloses heater control through modulation and amplification to a thyratron tube.

Verden, U.S. Pat. No. 3,401,880, and Forbes, U.S. Pat. No. 3,421,691, disclose a SCR which fires with current to a heat accumulator which affects a thermostat.

Evalds, U.S. Pat. No. 3,419,214, shown SCR and bridge circuitry in temperature regulating apparatus.

Muskovac, U.S. Pat. No. 3,544,766, discloses a firing circuit for proportionally controlling energy to a load from an alternating source. The circuit includes a thyristor in series connection with the load and source, a gate circuit, and connection to the gate of the thyristor and the source for generating an application of trigger pulses to the gate. The gate circuit has a sensor branch which includes a conditioning responsive impedance. The sensor branch controls the application of the trigger pulses with respect to the conductive half cycles of the source in response to the condition and initiates thyristor conductions in response thereto. The sensor branch is cycled to provide timed proportional control of the thyristor. In one embodiment of Muskavac, cycling means is included within the sensor branch and impresses a cyclic voltage variation on the impedance. In another of his embodiments, an auxiliary load produces the condition aspired with the main load and is closely coupled to the condition responsive impedance so as to cause a secondary firing cycle imposed upon a primary cycle resulting from the impedance response to average environmental conditions.

Chambers, U.S. Pat. No. 3,670,960, is of interest for its showing of pulsing and use of SCRs in heating control.

Buckwalter, U.S. Pat. No. 3,834,618, discloses a separate unit thermostat the regular heater control with a timer which allows heat from a heat source to affect a thermostat under which it is placed to obtain a temperature setback level for a predetermined time.

The remaining cited patents, set forth above, all show some circuit similarities to applicant's disclosure and, therefore, are included as of interest. However, such patents are considered not to be anticipatory, in the slightest, whether considered by themselves or in any combination thereof.

The most pertinent of the foregoing cited patents, with respect to the instant invention, is the patent to Buckwalter, U.S. Pat. No. 3,834,618. Applicant's device operates differently and has a different principle than Buckwalter, though one of the goals of both Buckwalter and the applicant are common, namely to conserve energy during the nighttime. The comments made by Buckwalter in certain portions of his specification are pertinent to applicant's invention, and hence several paragraphs following hereinbelow which were applicable to Buckwalter are also applicable to this instant invention:

Both inventions, in part, relate to apparatus for automatically setting back the temperature of a room controlled by a conventional heating system during selectable time periods.

As background of the invention, Buckwalter stated, and it is equally applicable here, that:

"Conventionally one may manually set a thermostat back to a lower night time temperature for comfort or fuel economy. This manual setback method has a disadvantge in that the temperature in the morning is too cold for comfort. Devices for automatically varying the temperature of a room during night time hours have been widely employed and described in the art and provide the comfort of a warm-up before arising. Typically, a timer is employed to determine when a temperature setback condition is to become effective. An early U.S. Pat. No. describing a timer in use with a thermostat controlled heating system is the patent to Otis U.S. Pat. No. 1,207,618. A night and day time temperature regulating system is described in the U.S. Pat. Nos. 1,876,636 and 1,931,464 to Dicke. The U.S. Pat. No. 1,876,636 described a heat source which simulates a change in temperature of a room by applying heat to a thermostat. The heat source thus causes the thermostat to register a higher room temperature than actually exists and thus inhibits the heating system operative in the room from being energized as long as the heat source is on. In response to this simulation, the thermostat de-energizes the heating system operative in the room to obtain, for example, a cooler night time room temperature with a corresponding saving in fuel. The system described in the Dicke patents requires substantial wiring to install with electrical connections to the heating system to bring the clock operated temperature setback mechanism into operation. Such structural changes may be convenient to install during the building of a house but require extensive work to install with existing heating systems.

"In the German patent publication Auslegeschrift No. 1,248,261 applied for in 1964 and laid open for inspection Aug. 24, 1967, a glow lamp is employed adjacent to a temperature sensor to simulate a higher temperature when a timer enables electrical power to be applied to the glow lamp. Energization of the glow lamp provides a high temperature simulation, which causes closure of a heating fluid control valve connected in series with a radiator. The timer controlled heating system described in the German patent prevents any heat from reaching the radiator during the time the timer energizes the glow lamp. Thus the room temperature slowly descends to whichever external temperature may exist until the timer disables the glow lamp to enable resumption temperature the heating system.

"Other recent patents relating to temperature setback devices are in U.S. Pat. No. 3,386,496 to O'Connor, and to Schuller U.S. Pat. No. 3,525,222. In the Schuller patent a temperature regulator for an electric refrigerator is described wherein a heat source simulates a requirement for refrigeration in excess of what is actually necessary in order to maintain the refrigerator temperature sufficiently below the dew point. U.S. Pat. No. 3,251,549 to Hewitt, Jr. et al., relates to an illuminated thermostat for use with a domestic heat control system.

"A significant disadvantage and inconvenience of temperature setback devices described in these various patents involves the extensive structural changes needed to install a temperature setback device in existing domestic heating systems. The installation commonly requires the addition of wires which are routed inside walls and floors to connect to furnace controls. These modifications tend to increase the cost of a night time temperature setback device with an expensive charge for installation. As a result, the extensive use of temperature setback devices has been less attractive to the home owner. Yet a widespread use of night time temperature setback devices would be of significant advantage in any age where energy conservation is beneficial to the public and is a publicly recognized and supported policy."

In essence, Buckwalter, U.S. Pat. No. 3,834,618, utilizes a temperature setback control including a housing which may be utilized with existing heating systems by mounting the housing with this control within an airflow influencing distance from a conventional room thermostat which controls the heating system. The Buckwalter housing produces a convection flow of heated air during a setback time period to obtain a temperature setback level in the room heating zone or building in which the thermostat is located. A temperature sensor (actually another thermostat) regulates the operation of the control to maintain the room at the setback temperature level determined by the value set on the separate thermostat. A housing to enable the influencing of the thermostat with the convection flow of heated air is described by Buckwalter.

SUMMARY OF THE INVENTION

In a temperature setback control in accordance with the invention, automatic temperature setback is provided in a convenient manner with existing heating systems without requiring any wire modifications or domestic structural changes.

A temperature setback controlled module in accordance with the invention is mounted adjacent a conventional heating system thermostat, such as employed in homes, apartments, offices, public accommodations, and the like. The module is controlled via existing thermostat wiring from the heating system by a modulated controlled signal on a low voltage 60 cycle carrier. Two connections are made to existing thermostat heat connections and a supplemental heater is positioned adjacent the bi-metallic element inside the thermostat.

It is an object of this invention to provide novel methods and apparatus for saving on heating system operating costs by automatically setting back the temperature set points on an existing thermostat or thermostats in a given heating system, whereby a saving in energy or fuel can by realized by reducing the operating temperature during a heating season.

Another object of this invention is to provide novel means and methods for automatically, consistently and accurately and conveniently setting back an existing thermostat.

Still another object of this invention is to provide new and improved means and methods for performing such setback without the need for the unsightly addition of wires to an existing thermostat.

Yet another object of this invention is to provide a new and improved temperature setback system which requires only one timer control unit for a heating system.

In accordance with one embodiment of this invention, a temperature setback controlling system is suitable for use in a building wherein a thermostat having a room temperature sensing element is employed on a wall in a first room to sense room temperature for control of a heating system effective in the first room to maintain a thermostat selected ambient room temperature, wherein heating controls for the heating system including a transformer having a secondary winding for providing low voltage 60 Hz power are located in a second room of the building, and wherein a thermostat cable coupling the thermostat in the first room to the heating controls in the second room is located at least partially within interior walls of the building. The temperature setback controlling system includes timed control means which are adapted to be coupled to the transformer winding for modulating during selected time periods cycles of one polarity of the 60 Hz low voltage with a high frequency. Detector means, adapted to be coupled to the thermostat cable in the first room for detecting the high frequency modulation during cycles of the one polarity, are coupled to a resistive heater for providing current flow thereto in response to such detected modulation. The resistive heater is adapted to be placed in proximity to the room temperature sensing element of the thermostat. Thus, the ambient temperature in the first room tends to be maintained at a predetermined temperature setback during the selected time periods. In accordance with certain features of the invention, the timed control means includes an electrical timer coupled to a switch so that the switch is closed during selected time periods and is opened during non-selected time periods. The timed control means further includes the switch, an electronic oscillator circuit, and a unilateral conducting means coupled together in a serial circuit, which serial circuit is adapted to be coupled to the transformer secondary winding. In accordance with still other features of the invention, the electronic oscillator circuit includes an amplifier having its input terminal coupled to the output terminal of a multivibrator. In accordance with yet other features of the invention, the detector means includes a manual switch having one terminal being adapted to be coupled to the thermostat cable, and another terminal being coupled to a first junction point. A silicon controlled rectifier (SCR) has its cathode adapted to be coupled to the thermostat cable. The first junction point, a resistor and a light emitting diode are serially coupled to the anode of the SCR. The diode is so oriented that its direction of conductivity is in the same direction as the rectifier. A capacitor is coupled across the anode and the gate electrode of the SCR. A second resistor is coupled across the cathode and the gate electrode of the SCR. Further, a variable potentiometer couples a second junction point to the anode of the SCR and means are provided for coupling the junction points to the resistive heater.

In accordance with still another embodiment of the invention, a temperature setback controlling system is suitable for use in building wherein a thermostat having a room temperature sensing element is employed on a wall in a first room to sense room temperature for control of a heating system effective in the first room to maintain a thermostat selected ambient room temperature, wherein heating controls for the heating system including a transformer having a secondary winding for providing low voltage 60 Hz power are located in a second room of the building, and wherein a thermostat cable coupling the thermostat in the first room to the heating controls in the second room is located at least partially within interior walls of the building. The temperature setback controlling system includes timed control means which are adapted to be coupled to the transformer winding. Such time control means modulates during one set of elected time periods cycles of positive polarity of the 60 Hz low voltage with a high frequency and modulates during a second set of selected timed periods cycles of negative polarity of the 60 cycle low voltage with a high frequency. Two resistive heaters are adapted to be placed in proximity to the room temperature sensing element. Detector means, adapted to be coupled to the thermostat cable in the first room for detecting high frequency modulations, are coupled to the resistive heaters for providing current flow to one heater in response to detected modulating during cycles of positive polarity and for providing current flow to the other heater in response to detected modulation during cycles of negative polarity. Thus, the ambient temperature in the first room tends to be maintained at a first predetermined temperature setback during one set of selected time periods and at a second predetermined temperature setback during a second set of selected time periods and, during those intervals when both sets of time periods overlap, the ambient room temperature in the first room tends to be maintained at a third predetermined temperature setback. In accordance with certain features of the invention, the timed control means includes an electrical timing means coupled to two switches so that the first switch is closed during one set of selected time periods and is otherwise normally opened, and so that the second switch is closed during the second set of selected time periods and is otherwise normally opened. The first switch, a first electronic oscillator circuit, and a first unilateral conducting means are coupled in a first serial circuit. The second switch, a second oscillator circuit, and a second unilateral conduction means are coupled in a second serial circuit. Both serial circuits are coupled in an opposing shunt relation, so that the resulting shunt circuit is adapted to be coupled to the transformer secondary winding. In accordance with still other features of the invention, at least one of the foregoing electronic oscillator circuits includes a multivibrator having its output terminal coupled to the input terminal of an amplifier.

In accordance with yet other features of the invention, the detector means includes a resistor and a light emitting diode serially coupled to an anode of a first silicon controlled rectifier (SCR). Another resistor and another light emitting diode are serially coupled to an anode of a second SCR. A first capacitor is coupled across the anode and gate electrode at the first SCR, and second capacitor is coupled across the anode and gate electrode of the second SCR. A third resistor is coupled across the cathode and gate electrode of the first SCR and a fourth resistor is coupled across a cathode and gate electrode of the second SCR. A first variable potentiometer has one of two terminals coupled to the anode of the first SCR. A second variable potentiometer has one of two terminals coupled in the anode of the second SCR. The other terminal of the first potentiometer and the cathode of the second SCR are coupled to the first resistive heater. Similarly, the other terminal of the second potentiometer and the cathode of the first SCR are coupled to the second resistive heater. A pair of leads are adapted to be coupled to the thermostat cable. The first resistor and the cathode of the second SCR are coupled to the first of the leads. The second named resistor and the cathode of the first SCR are coupled to the second of the leads.

In accordance with still another embodiment of the invention, a temperature setback controlling system is suitable for use in a building wherein a thermostat having a room temperature sensing element is employed on a wall in a first room to sense room temperature for control of a heating system effective in the first room to maintain a thermostat selected ambient room temperature in the first room, wherein another thermostat having a room temperature sensing element is employed on a wall in a second room to sense room temperature for control of a heating system effective in the second room to maintain a thermostat selected ambient room temperature in the second room, wherein heating controls for the heating system including a transformer having a secondary winding for providing low voltage 60 Hz power are located in the third room of the building, and wherein thermostat cables coupling the thermostats to the heating controls are located at least partially within interior walls of the building. The temperature setback controlling system includes timed control means, adapted to be coupled to the transformer winding, for modulating during selected time periods cycles of one polarity of the 60 Hz low voltage with a high frequency. A first resistive heater is adapted to be placed in proximity to the first room, room temperature sensing element. A second resistive heater is adapted to be placed in proximity to the second room, room temperature sensing element. A first detector means, adapted to be coupled to the thermostat cable in the first room, detects high frequency modulation during cycles of the one polarity and is coupled to the first resistive heater for providing current flow thereto in response to the detected modulation. Thus, the ambient temperature in the first room tends to be maintained at a predetermined temperature setback during the selected time periods. Second detector means, adapted to be coupled to the thermostat cable in the second room, detects high frequency modulation during cycles of the one polarity and is coupled to the second resistive heater for providing current flow thereto in response to the detected modulation. Thus, the ambient temperature in the second room tends to be maintained at a predetermined temperature setback during the selected time periods. In accordance with certain features of the invention, the timed control means includes an electrical timer coupled to a switch so that the switch is closed during selected time periods and is open during non-selected time periods. The switch, an electronic oscillator circuit, and unilateral conducting means are coupled in a serial circuit, which serial circuit is adapted to be coupled to the transformer secondary winding. In accordance with still other features of the invention, the electronic oscillator circuit includes a multivibrator having its output terminal coupled to an input terminal of an amplifier. In accordance with yet other features of the invention, the detector means includes a manual switch having two terminals. One terminal is adapted to be coupled to the thermostat cable; the other terminal is coupled to a first junction point. A silicon controlled rectifier (SCR) has its cathode adapted to be coupled to the thermostat cable. The first junction point, a resistor, and a light emitting diode are serially coupled to the anode of the SCR. The light emitting diode is so oriented that its direction of conductivity is in the same direction as the rectifier. A capacitor is coupled across the anode and the gate electrodes of the SCR. A second resistor is coupled across the cathode and the gate electrode of the SCR. A variable potentiometer couples the second junction point to the anode of the SCR. The junction points are coupled to the resistive heater.

In accordance with yet another embodiment of this invention, a temperature setback conrolling system is suitable for use in a building wherein a thermostat having a room temperature sensing element is employed on a wall in a first room to sense room temperature for control of a heating system effective in the first room to maintain a thermostat selected ambient room temperature in the first room, wherein another thermostat has a room temperature sensing element is employed on a wall in a second room to sense room temperature for control of the heating system effective in the second room to maintain a thermostat selected ambient room temperature in the second room, wherein the heating controls for the heating system including a transformer having a secondary winding for providing low voltage 60 Hz power are located in a third room of the building, and wherein thermostat cables that couple the thermostats to the heating controls are located at least partially within interior walls of the building. The thermostat setback coupling system includes timed control means which are adapted to be coupled to the transformer winding. The timed control means modulate during one set of selected time periods cycles of positive polarity of the 60 Hz low voltage with a high frequency and modulate during a second set of selected time periods cycles of negative polarity of the 60 Hz low voltage with a high frequency. A first resistive heater is adapted to be placed in proximity to the first room, room temperature sensing element. Similarly, a second resistive heater is adapted to be placed in proximity to the second room, room temperature sensing element. First detector means, which are adapted to be coupled to the thermostat cable in the first room, detects the high frequency modulation during cycles of positive polarity and are coupled to the first resistive heater for providing current flow thereto in response to such detected modulation. Thus, the ambient temperature in the first room tends to be maintained at a predetermined temperature setback during such one set of selected time periods. Further, a second detector means, adapted to be coupled to the thermostat cable in the second room, detects the high frequency modulation during cycles of negative polarity and are coupled to the second resistive heater for providing current flow thereto in response to such detected modulation. Thus, the ambient temperature in the second room tends to be maintained at a predetermined temperature setback during the second set of selected time periods. In accordance with certain features of the invention, the timed control means includes electrical timing means coupled to two switches. The first switch is closed during one set of selected time periods and is otherwise normally opened; the second switch is closed during the second set of selected time periods and is otherwise normally opened. Further, the first switch, a first oscillator circuit, and a first unilateral conducting means are coupled in a first serial circuit. Also, the second switch, a second electronic oscillator circuit, and a second unilateral conducting means are coupled in a second serial circuit. Both serial circuits are coupled in an opposing shunt relation whereby the resulting shunt circuit is adapted to be coupled to the transformer secondary winding. In accordance with still other features of the invention, at least one of the foregoing electronic oscillator circuits includes a multivibrator having its output terminal coupled to the input terminal of an amplifier.

In still yet another embodiment of this invention, timed control means, adapted to be coupled to a secondary winding of a transformer whose primary winding has a 60 Hz voltage applied thereacross, for modulating during selected time periods cycles of one polarity of low 60 Hz voltage with a high frequency, includes an electrical timer coupled to a switch so that the switch is closed during selected time periods and is opened during non-selected time periods. The switch, an electrical oscillator circuit, and unilateral conducting means are coupled in a serial circuit, which serial circuit is adapted to be coupled to the transformer secondary winding.

In still another embodiment of the invention, timed control means, adapted to be coupled to a secondary winding of a transformer whose primary winding has a 60 Hz voltage applied thereacross for modulating during selected time periods cycles of one polarity of low 60 Hz voltage with a high frequency, includes electrical timing means coupled to a pair of switches. The first switch is closed during one set of selected time periods and is otherwise normally opened, the second switch is closed during the second set of selected time periods and is otherwise normally opened. The first switch, a first electronic oscillator circuit, and a first unilateral conducting means are coupled in a first serial circuit. The second switch, a second electronic oscillator circuit, and a second unilateral conducting means are coupled in a second serial circuit. The two serial circuits are coupled together in an opposing shunt relation so that they are adapted to be coupled to the transformer secondary winding.

In yet another embodiment of the invention, a novel combination includes a resistive heater adapted to be placed in proximity to a room temperature sensing element of a thermostat employed on a wall of a room, and detector means adapted to be coupled to a thermostat cable which engages with the thermostat. The detector means detects high frequency modulation during cycles of one polarity on the cable and provides current flow through the resistive heater in response to such detected modulation. Thus, the ambient room temperature in the room tends to be maintained at a predetermined temperature setback during time periods of such detected modulation.

In still another embodiment of the invention, a method of temperature setback control is suitable for use in a building wherein a thermostat having a room temperature sensing element is employed on a wall in a first room to sense room temperature for control of a heating system effective in the first room to maintain a thermostat selected ambient room temperature, wherein heating controls for the heating system including a transformer having a secondary winding for providing low voltage 60 Hz power are located in a second room of the building, and wherein the thermostat cable coupling the thermostat in the first room to the heating controls in the second room is located at least partially within interior walls of the building. The method includes modulating cycles of one polarity of the low 60 Hz voltage with a high frequency during selected time periods, detecting the high frequency modulation at the thermostat cable in the first room, and applying heat to the room temperature sensing element in response to such detected modulation.

In accordance with yet still another embodiment of the invention, a method of temperature setback control is suitable for use in a building wherein a thermostat having a room temperature sensing element is employed on a wall in a first room to sense room temperature for control of a heating system effective in the first room to maintain a thermostat selected ambient room temperature in the first room, wherein another thermostat having a room temperature sensing element is employed on a wall in a second room to sense room temperature for control of the heating system effective in the second room to maintain a thermostat selected ambient room temperature in the second room, wherein heating controls for the heating system including a transformer having a secondary winding for providing low voltage 60 Hz power are located in a third room of the building, and wherein thermostat cables coupling the thermostats to the heating controls are located at least partially within interior walls of the building. The method includes modulating cycles of positive polarity of the low 60 Hz voltage with a high frequency during one set of selected timer periods, modulating cycles of negative polarity of the low 60 Hz voltage with a high frequency during a second set of selected time periods, detecting the modulation during cycles of positive polarity at the thermostat cable in the first room, applying heat to the first room-room temperature sensing element in response to such detected modulation, detecting the modulation during cycles of negative polarity at the thermostat cable in the second room, and applying heat to the second room-room temperature sensing element in response to such detected modulation during cycles of such negative polarity.

BRIEF DESCRIPTION OF THE DRAWINGS

Other objects, advantages, and features of this invention will become more apparent from the following specification, when read in conjunction with the accompanying drawings, in which like reference numerals refer to like components and parts, and in which.

DESCRIPTION OF THE INVENTION

Figure 1:
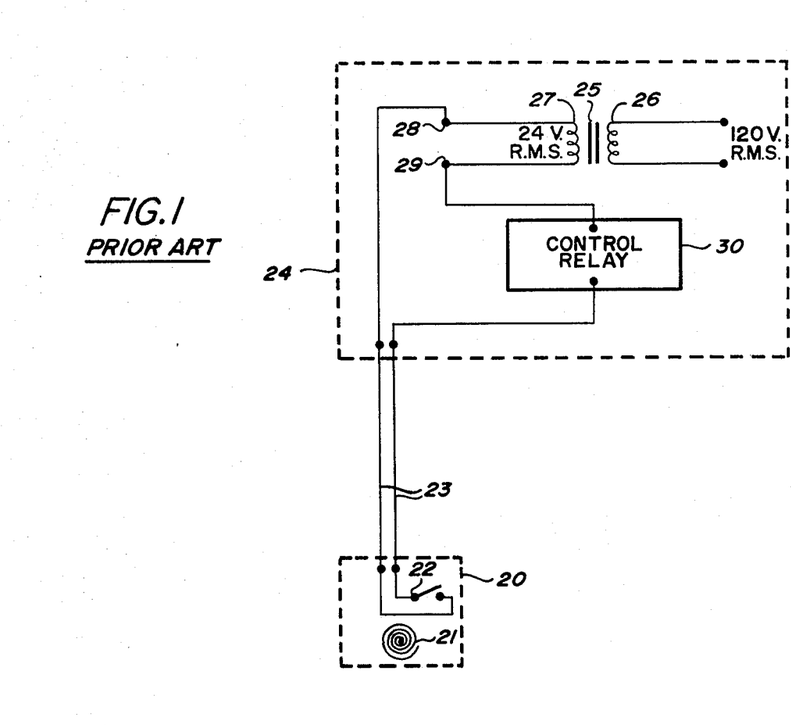
FIG. 1 is a diagrammatic view of a typical heating system control unit and thermostat interwired in accordance with known conventional techniques.

Referring to FIG. 1, there is depicted a low voltage thermostat 20 which is typically mounted on a wall of a first room in a building. The low voltage thermostat 20 includes a temperature sensitive element 21 which, at a particular ambient temperature, causes a switch 22 to be closed. The switch 22 is in a circuit which is coupled to a thermostat cable 23. The thermostat cable 23 is mounted, at least partially, in the interior walls of the building. In another room of the building, possibly the basement, is located a heating system control unit 24 in which, typically, an oil burner or other fuel unit is located. The interior heating system control unit includes a transformer 25 having its primary winding coupled to a source of alternating voltage, typically 60 Hz, and the primary winding 26 may be coupled either to 120 volts RMS or 240 volts RMS. The secondary winding 27 of the transformer 25 has a pair of terminals 28, 29, one of which is coupled through a control relay 30 to one lead of the thermostat cable 23. The other terminal is coupled to a second lead of the thermostat cable 23.

Figure 2:
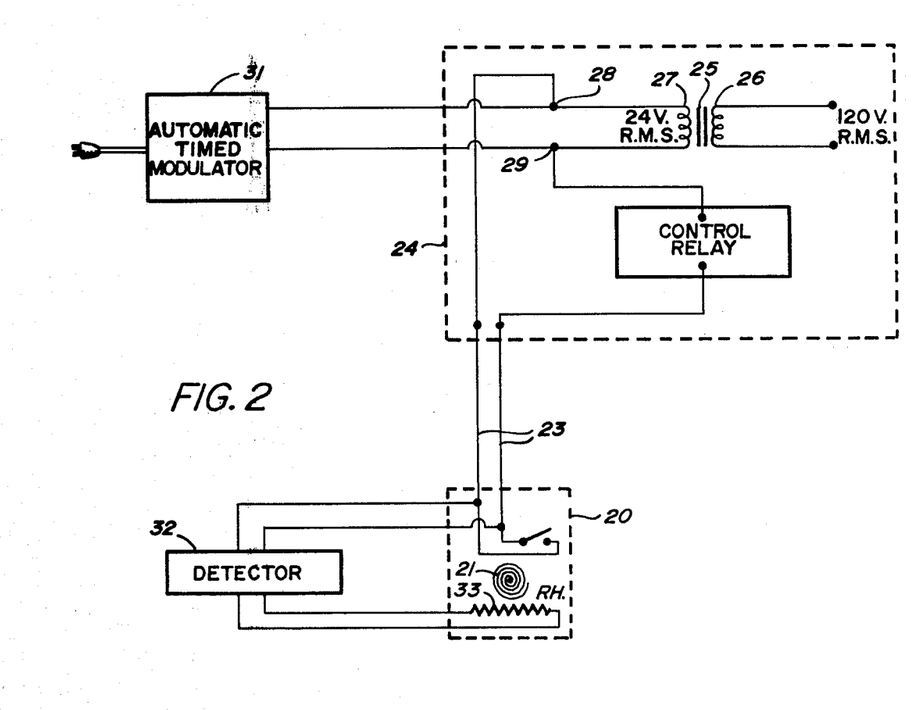
FIG. 2 is a diagrammatic view of the combination shown in FIG. 1, modified in accordance with one embodiment of this invention.

In accordance with an embodiment of the invention, an automatic timed modulator 31, as shown in FIG. 2, is coupled across the terminals 28, 29 of the secondary winding 27 of the transformer 25 of the typical heating system control unit 24 located in the second room of the building. In the first room, a detector module 32 is coupled across the thermostat cable 23 to detect the modulation produced by the automatic timed modulator 31 and, upon such detection, provide current to a resistive heater 33 which is placed in proximity to the temperature sensing element 21 of the low voltage thermostat 20.

Figure 3:
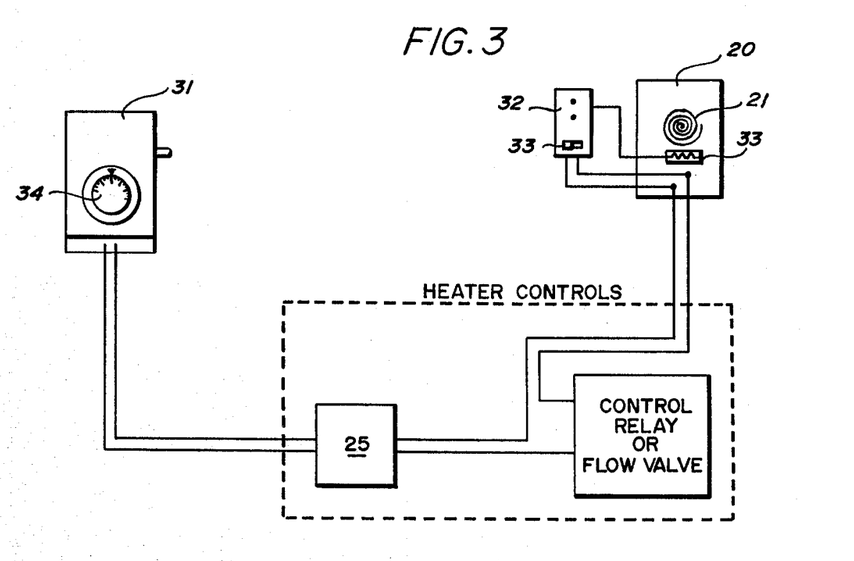
FIG. 3 is an artistic representation of the combination shown in FIG. 2, depicting a timed control means and a detector module in combination with the existing heater controls and thermostat of a typical building.
Figure 4:
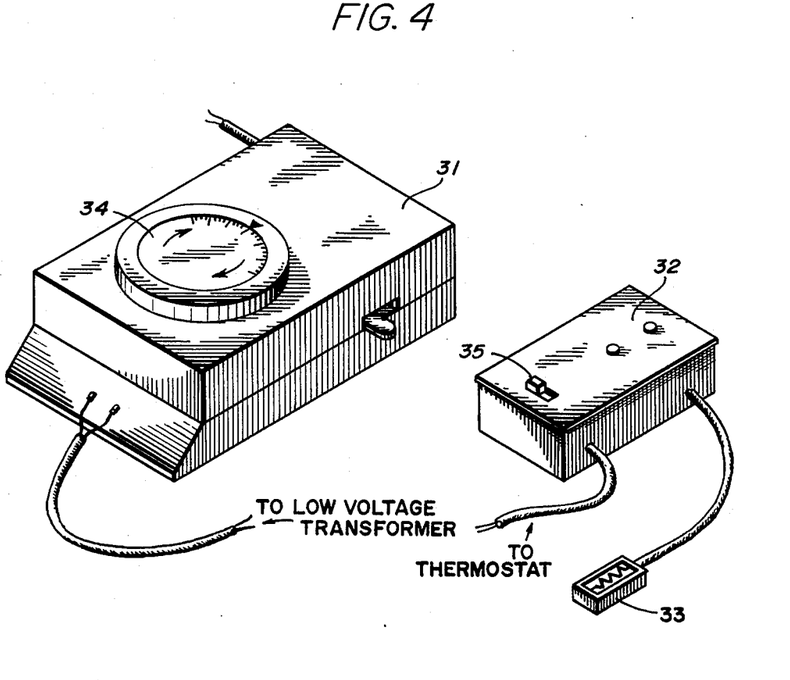
FIG. 4 is a perspective view of the timed control means and the detector module in accordance with one embodiment of this invention.

The automatic timed modulator 31 can be a separate integrated unit, as depicted in FIG. 4 which is coupled to the transformer 25, as depicted in FIG. 3. Likewise, the detector module 32 can be a separate integrated unit, as depicted in FIG. 4, coupled to the thermostat 20, as depicted in FIG. 3.

The automatic timed modulator 31, as shown in FIG. 4, can basically include a conventional timer 34 as a portion thereof. The detector module 32 is an integral unit with its components mounted in a housing and includes an on-off switch 35, and when sold commercially, preferably would include a resistive heater 33 as a portion of its overall circuit.

Figure 5:
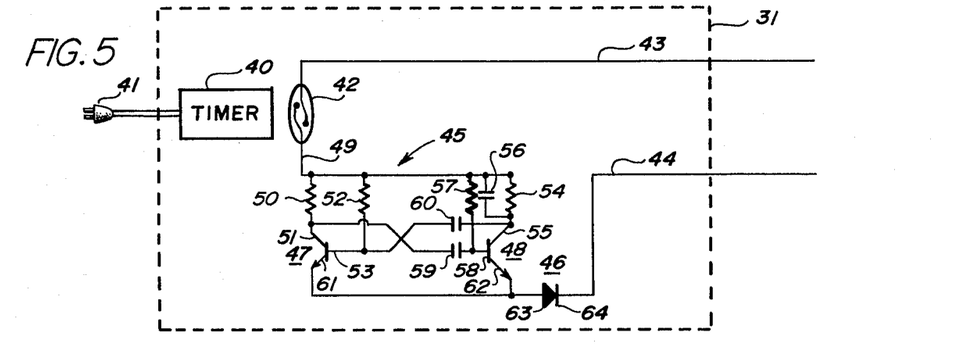
FIGS. 5, 6, 7, 8, and 9 are diagrams of timed control means in accordance with various embodiments of the invention.

Referring to FIG. 5, there is shown an automatic timed modulator 31 within the dotted outline shown. The timed modulator 31 includes a conventional timer mechanism 40 which is powered through a plug 41 to line current. The timer 40 causes a relay contact or switch 42 to be closed in accordance with selected time intervals. One end of the switch 42 is coupled to one lead 43. The lead 43 and another lead 44 are adapted to be coupled to the secondary winding 27 of a transformer 25, as depicted in FIGS. 2 and 3. The other end of the switch 42 is coupled through an electronic oscillator 45 which may be, for example, a free-running or astable multivibrator. The output of the electrical oscillating circuit 45 is coupled through a diode or unilateral conducting means 46 to the lead 44.

The oscillator 45 can include a pair of NPN transistors 47, 48. The other end 49 of the switch 42 is coupled through a resistor 50 to the collector 51 of the transistor 47. The end 49 is also coupled to a resistor 52 which is coupled to the base 53 of the transistor 47. A resistor 54 is coupled between the end 49 and the collector 55 of the transistor 48. The resistor 54 has a capacitor 56 coupled thereacross. A resistor 57 connects the end 49 to the base 58 of the transistor 48. A capacitor 59 is coupled between the collector 51 of the P-type transistor 47 and the base 58 of the P-type transistor 48. A capacitor 60 is coupled across the base 53 of the transistor 47 and the collector 55 of the transistor 48. The emitters 61, 62 of the P-type transistors 47, 48, respectively, are coupled together to the anode 63 of the diode 46 whose cathode 64 is connected to the lead 44.

Figure 6:
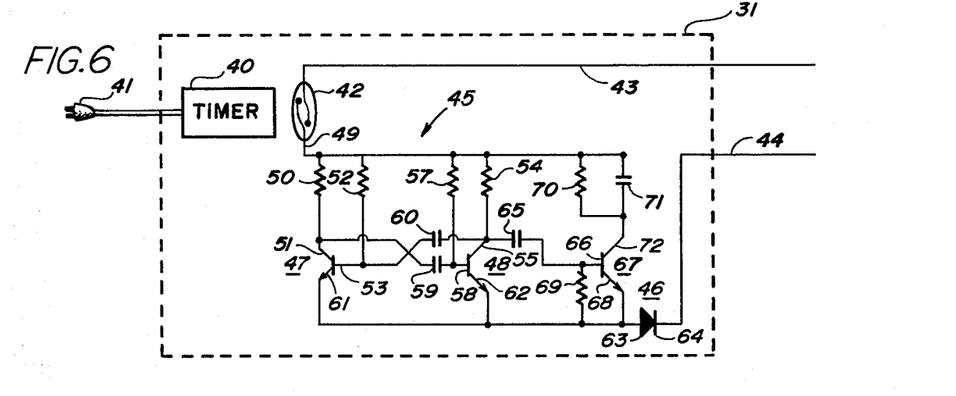

Referring to FIG. 6, it is noted that the circuit is fairly similar to that shown in FIG. 5 with the following exceptions: The capacitor 56 is deleted so that the resistor 54 does not have a capacitance applied thereacross. The collector 55 of the P-type transistor 48 is coupled via a capacitor 65 to the base 66 of an NPN transistor 67 whose emitter 68 is coupled to the anode 63 of the unaliteral conduction means 46. Also coupled to the anode 63, in addition to the emitters 61 and 62 of the transistors 47 and 48, is a resistor 69 which is coupled across the base 66 and the emitter 68 of the transistor 67. A shunt circuit, including a resistor 70 and a capacitor 71, is coupled between the end 49 of the switch 42 to the collector 72 of the P-type transistor 67.

Figure 7:
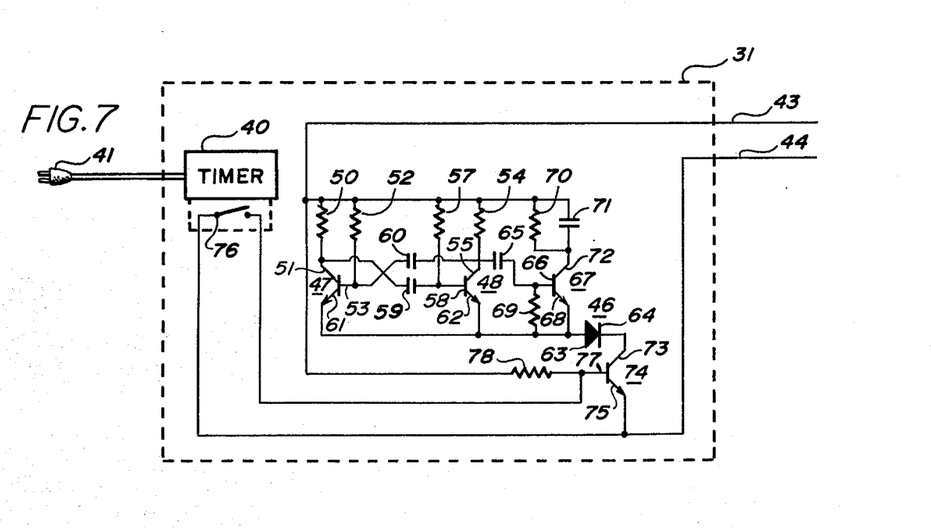

Referring to FIG. 7, there is shown a circuit similar to FIG. 6 with the following differences: The cathode 64 of the diode 46 is not directly connected to the lead 44. In lieu thereof, the cathode 64 is connected to the collector 73 of an NPN transistor 74 whose emitter 75 is connected to the lead 44. The timer 40 is also coupled in such a manner so as to actuate a switch or relay 76. The switch 76 is coupled across the base 77 and the emitter 75 of the transistor 74. The base 77 is connected to the terminal 49 of the switch 42 via a resistor 78.

Figure 8:
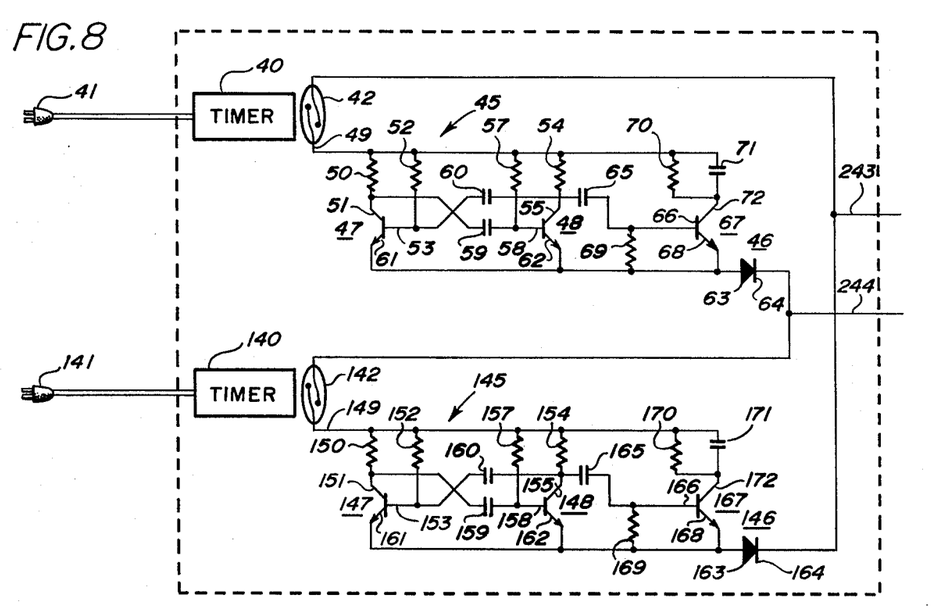
Figure 9:
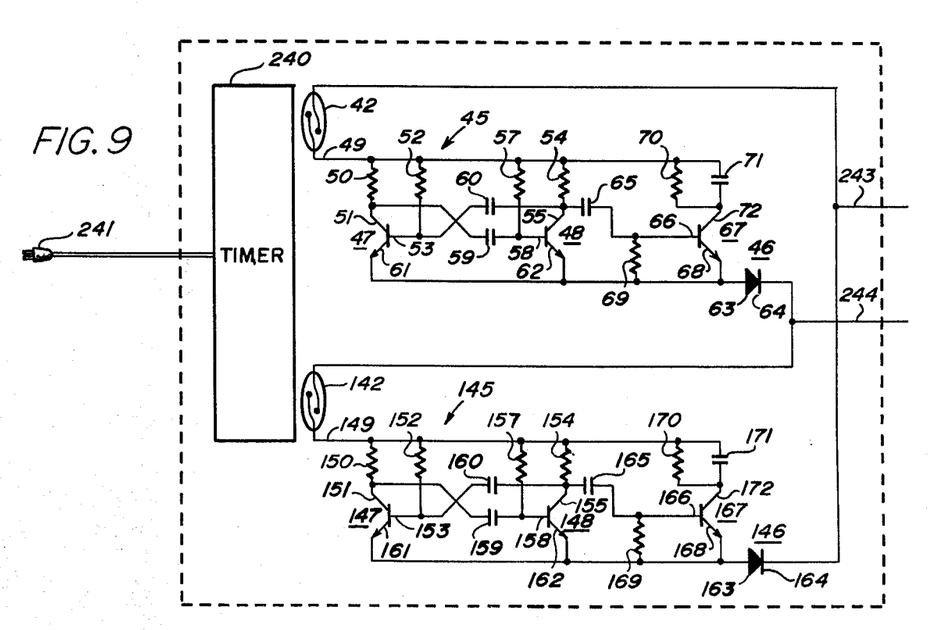

Two sets of timing controls are depicted in FIGS. 8 and 9. In FIG. 8, a pair of leads 243 and 244 are adapted to be coupled to the secondary winding 27 of the transformer 25 found in the typical heating system control unit 24. That portion of the circuit shown in the top part of FIG. 8 corresponds generally to that shown in FIG. 6. The bottom portion of the circuit is substantially duplicated wherein each of the reference components includes reference numerals carrying a designation 100 in excess of those like components shown at the top portion of the figure. The switch 42 is coupled to the lead 243. The cathode 64 of the oscillator 46 is coupled both to the lead 244 and also to the switch 142. The cathode 164 of the diode 146 is coupled to the lead 243, which, as stated above, is also coupled to the switch 42. As depicted in FIG. 8, two timers are used: timer 40 and timer 140, each carrying therewith separate plugs 41 and 141 for insertion into line current. Each timer 40, 140 is coupled to actuate its corresponding switch 42, 142.

The circuit depicted in FIG. 9 is similar to that shown in FIG. 8, with the exception that a separate timing means 240 controls both switches 42 and 142. The timer 240 is coupled through its separate plug 241 into the line current. In essence, the circuit shown in FIG. 9 utilizes one timer having two sets of timing controls in lieu of two separate timers 40, 140 shown in FIG. 8.

Figure 10:
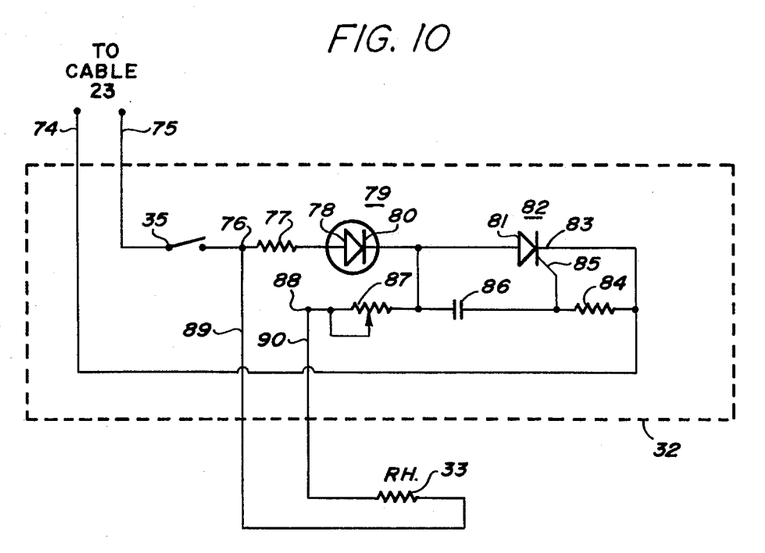
FIG. 10 is a circuit diagram of a detector means in accordance with one embodiment of the invention.

Referring to FIG. 10, there is shown a detector module 32 in diagrammatic relation including a pair of terminals 74, 75 which are adapted to be coupled to a thermostat cable 23 at a wall in which a thermostat 20 is mounted. The detecting module 32 includes an on-off switch which connects the terminal 75 to a first junction point 76. A resistor 77 connects the junction point 76 to an anode 78 of a light emitting diode 79 whose cathode 80 is connected to an anode 81 of a silicon controlled rectifies 82, hereinafter termed an ACR. The cathode 83 of the SCR 82 is connected to the terminal 74. A resistor 84 is coupled across the gate electrode 85 of the SCR 82 and its cathode 83. A capacitor 86 is coupled across the anode 81 and the gate electrode 85 of the SCR 82. A variable potentiometer 87 couples the anode 81 of the SCR 82 to a second junction point 88.

The potentiometer or rheostat 87 may be a continuous potentiometer or, in desired modes of application, may be a discrete type with steps of various values.

The junction points 76 and 78 are coupled via suitable leads 89, 90 to the resistive heater 33.

Figure 11:
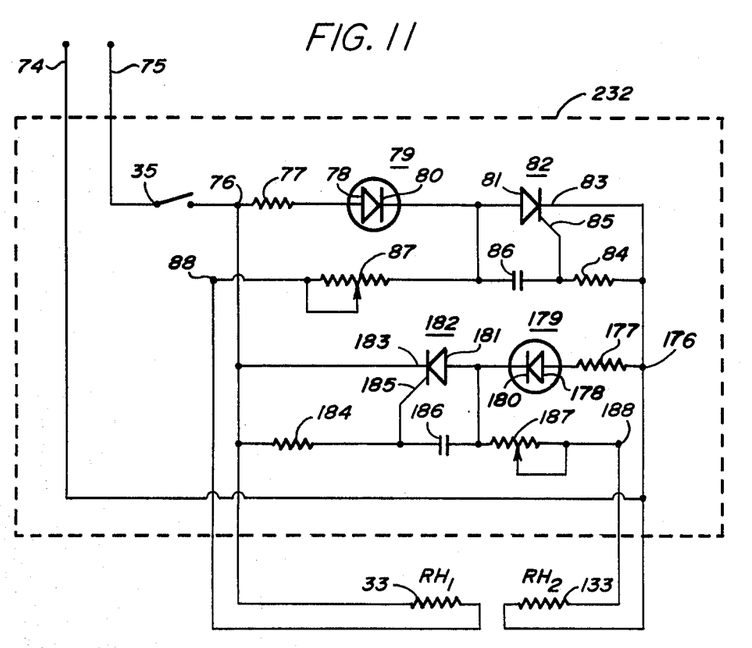
FIG. 11 is a circuit diagram of other detector means in accordance with another embodiment of the invention.

Referring to FIG. 11, there is shown another embodiment, including, in effect, a pair of detector circuits in one detector module, each of the detector circuits having an individual control for operating its respective resistive heater 33, 133. As shown in FIG. 11, like components have reference numerals designated with numerals 100 in excess of those of corresponding numerals for the other portions. Thus, the terminal 75 is coupled through the switch 35 to a first junction point 76. The junction point 76 is coupled through a resistor 77 to a light emitting diode 80 as described hereinabove in connection with FIG. 10. The first junction point 76 is also coupled to the cathode 183 of the SCR 182 and to the gate resistor 184 which is coupled to the gate electrode 185 of the SCR 182. The junction point 76 is coupled, as before, to the resistive heater 33 which, in turn, is coupled to the second junction point 88 as described in connection with FIG. 10.

The circuit of FIG. 11 also has the cathode 83 of the SCR 82 and the gate resistor 85 coupled to the terminal 74 as before shown in FIG. 10, and, in addition, is coupled to the light emitting diode resistor 177 and also to a third junction point 176. The variable rheostat 187, which is connected to the cathode 180 of the SCR 179, os coupled to a fourth junction point 188. The junctions points 176 and 188 are coupled through the resistive heater 133. Both heaters 33 and 133 may be placed inn proximity to a temperature sensitive element 21 of a thermostat 20 mounted on a wall of a room. Each resistor 33 and 133 can be separately controlled both by its corresponding variable rheostats 87 and 187 and by its corresponding timed controls, such as the circuits of FIGS. 8 or 9. Both heaters can be operated independently and, if desired, they may have periods of overlap.

Figure 12:
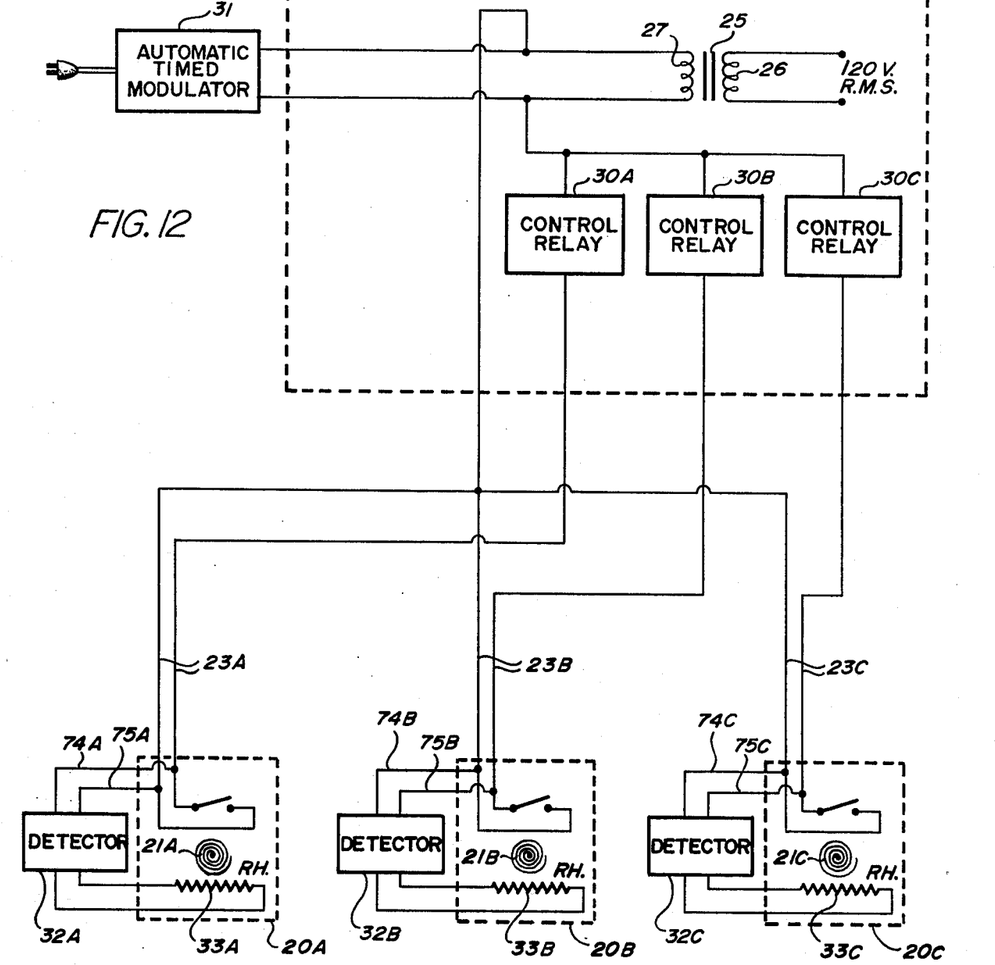
FIG. 12 is a block diagram of yet another embodiment of the invention.

Referring to FIG. 12, there is depicted an electrical diagram for controlling temperature setbacks in various rooms of a building. In the particular embodiment shown, there is shown an automatic timed modulator 31 coupled to the secondary winding 27 of a transformer 25. The automatic timed modulator 31 can include a circuit of the nature of FIGS. 8 and 9 wherein two separate timed control signals are sent.

Figure 13A:
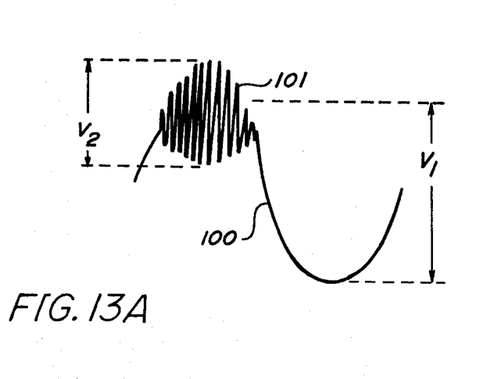
FIGS. 13a and 13b are a pair of wave forms useful for an understanding of this invention.
Figure 13B:
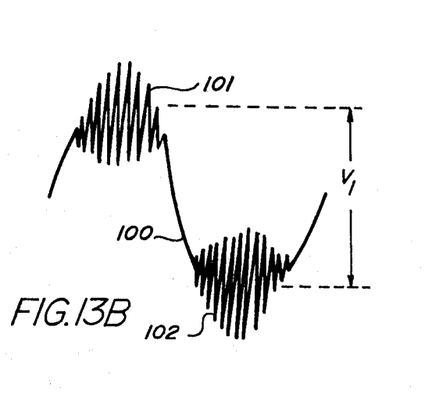

Referring to FIG. 13a, there is depicted a single cycle of 60 Hz voltage 100 having cycles of high frequency 101 superimposed upon portions of one polarity (such as positive). In accordance with a dual system such as that shown in FIGS. 8 and 9, high frequency can be imposed selectively upon either the positive or the negative cycles of the low frequency 60 Hz voltage 100. The positive cycles can have high frequency 101 superimposed during one set of selected time intervals, whereas the negative cycles can have cycles of high frequency 102 superimposed thereon, as depicted in FIG. 13b.

Referring again to FIG. 12, the automatic timed modulator 31 provides one set of timed signals comprising high frequency modulation 101 during one set of time periods onto the positive portions of the cycle 100, and during a second set of timed periods provides high frequency modulation 102 on the negative cycles of the low frequency 60 Hz voltage 100. These signals from the automatic time modulator are coupled to the secondary winding 27 of the transformer 25 in the typical heating system control unit and such signals are conveyed, via respective control relays 30A, 30B, 30C, along the thermostat cable 23 through the interior walls of the building.

At separate rooms A, B, and C, of a building which are individually provided with respective thermostats 20A, 20B, 20C, there are provided individual corresponding detectors 32A, 32B, 32C which are respectively coupled to individual resistive heaters 33A, 33B, 33C. The respective heaters 33A, 33B, 33C are so coupled in close proximity to the temperature sensing elements 21A, 21B, 21C of the thermostats 20A, 20B, 20C, respectively. It is noted, however, as shown in FIG. 12, that the detector 32A has its terminals 74A and 75B coupled in opposite direction to the thermostat cable 23A than the corresponding terminals 74B and 75B of the detector 32B and the terminals 74C, 75C of the detector 32C. Thus, the detector 32A detects the high frequency modulation during cycles of one polarity in accordance with one set of selected time periods generated by the modulator 31 whereas the detectors 32B and 32C detect cycles of modulation at the opposite polarity during the second set of selected time periods.

OPERATION OF THE INVENTION

The automatic timed modulator or timed control means together with the detector module and its corresponding resistive heater are designed to save on heating system operating costs by automatically setting back the temperature setpoint on an existing thermostat or thermostats in a given heating system.

A savings in energy or fuel can be realized when the operating temperature of a room is reduced during the heating season. By practicing this invention, a means are provided for automatically, consistently, accurately and conveniently setting back an existing room thermostat. The aforementioned setback is performed without the necessity to add unsightly additional wires to the room thermostat or to the device for assisting such aforementioned setback. By practicing the invention, only one timing control unit for any one heating system need be used. Referring to FIG. 5, the circuit includes an astable multivibrator which operates at a frequency, in a preferred mode, of approximately 40 KHz. The circuit of FIG. 6 includes an astable multivibrator with an amplifier stage added to boost the output power of the circuit. That circuit also operates at a preferred frequency of approximately 40 KHz. The diode 46, in both FIGS. 5 and 6, prevents alternating current from the transformer 25 from back biasing the oscillator circuit 45.

Referring to FIGS. 13a and 13b, there are shown wave forms, observed typically on an oscillocope, when the terminals 43 and 45 (FIGS. 5 and 6) are monitored. The cycle of 60 Hz current depicted in FIG. 13a, in an observed condition, has a peak to peak voltage $V_1$ of 44 volts. The 40 KHz pulses have a peak to peak voltage $V_2$ of from 15 to 20 volts. The circuits of FIGS. 5 and 6 produce a 60 Hz modulated 40 KHz carrier frequency signal which is sent throughout the entire heating system control circuit 24 without causing any change in the function or performance of the heating control system component parts. This signal provides a means for performing an additional control function over existing wires, such as a thermostat cable 23, in the heating control circuit, wherein a means for detecting the presence of the signal is performed by the detector circuit 32.

Another circuit for suitable commercial utilization, enables one to operate a frequency circuit similar to that depicted in FIG. 6, with the modification depicted in FIG. 7, wherein, a programmed time switch 76 is opeated normally open, rather than normally closed. Again, the terminals 43, 44 are coupled to the secondary winding of the transformer 25 which provides 24 to 30 volts AC RMS thereacross. Such a circuit shown in FIG. 7 is ideally used with a so called 7-day timer wherein the switch 76 is operated during specific time intervals every day, and wherein the switch 76 is not operated on, for example, weekends and holidays.

The detector circuit 32, depicted in FIG. 10, detects the signal providing along the thermostat cable 23 via the automatic timed modulator 31. When the terminals 74, 75 are connected in the correct phase on the normally open terminals of the thermostat, the resistor 33 generates heat when the switch 35 is closed and the 40 KHz signal generated by the circuit shown in FIGS. 5, 6, or 7 is present.

Automatic and consistent operation of the circuits are effected by incorporating the timer 34 into such a system. The circuit shown in FIGS. 3 and 4 illustrate how this is accomplished. The timer shown in FIGS. 3 and 4, which may be conventional, is modified to isolate its load output terminals from the input 120 volt AC 60 Hz power line provided via the plug 41. Hence, the leads 43 and the end 49 from the switch 42 are isolated electrically from the timer 40. In effect, the circuit shown in FIGS. 5, 6, or 7 is generally that shown in FIG. 4, but is connected as shown in FIG. 3. The detector circuit depicted in FIG. 10 functions whenever the timer switches on and it ceases to function when the timer switch is tripped off.

The resistive heater 33 of FIG. 10 is positioned in close proximity to the bimetallic strip or coil, termed "temperature sensitive element", inside the existing room thermostat 20. Whenever power is applied to the resistive heater 33, a thermal offset is created which provides the same affect as decreasing the set point on the room thermostat 20 itself. The variable rheostat 81 controls the amount of offset. Tests performed on the circuit depicted in FIG. 10 causes an offset variation, in accordance with one series of tests, from approximately 5° to 12°F. when the resistive heater 33 is located in contact with the bimetallic element 21. The light emitting diode 79 is incorporated so as to provide a means for observing that the temperature setback is functioning. The swith 35 assures that the timer control unit 32 can be manually overridden. It may be observed that two different levels of setback can be performed by effectively utilizing two detector circuits of the type shown in FIG. 10 with one circuit reversed in relationship with the other. Then, when the phase of the timer control unit is reversed or generated by a second unit, a second level of offset can be realized. FIG. 11 illustrates a method of achieving two levels of setback.

In the circuit shown in FIG. 11, the positive phased 40 KHz signal causes the SCR 82 to fire and causes the resistive heater 33 to generate heat. The positive signal enters through the terminal 75. A negative signal causes the SCR 182 to fire and causes the resistive heater 133 to generate heat. A negative signal in that case enters the terminal 75. No interaction between these combined circuits resulted during the course of tests.

The phasing of the 40 KHz signal was performed by reversing the leads 74, 74 of the detector circuit shown in FIG. 10. Terminal 75 generates a positive phase signal with respect to terminal 74, and visa-versa when the leads are reversed in the heating control circuit. Thus, as depicted in FIG. 12, one detector circuit, such as detector 32A, has its leads 74A and 75A coupled in the opposite direction to corresponding detectors 32B and 32C wherein those leads from such detectors are coupled in the opposite direction.

For purposes of illustration and not by way of limitation, the following values of components are effective in performing an operable circuit. In the circuit depicted in FIG. 5:

| Resistor 50 | 1 Kilohm |
| Resistor 52 | 22 Kilohms |
| Resistor 57 | 22 Kilohms |
| Resistor 54 | 1 Kilohm |
| Capacitor 60 | .001 Microfarad |
| Capacitor 59 | .002 Microfarad |
| Capacitor 56 | .05 Microfarad |

In the circuit shown in FIG. 6, the following values were found to be applicable:

| Resistor 50 | 1 Kilohm |
| Resistor 52 | 22 Kilohms |
| Resistor 57 | 22 Kilohms |
| Resistor 54 | 1 Kilohm |
| Resistor 70 | 330 Ohms |
| Resistor 69 | 1.8 Kilohms |
| Capacitor 59 | .001 Microfarad |
| Capacitor 60 | .001 Microfarad |
| Capacitor 65 | .001 Microfarad |
| Capacitor 71 | .05 Microfarad |

In the circuit shown in FIG. 7 the following values were found to be applicable:

| Resistor 50 | 1 Kilohm |
| Resistor 52 | 22 Kilohms |
| Resistor 57 | 22 Kilohms |
| Resistor 54 | 1 Kilohm |
| Resistor 70 | 330 Kilohms |
| Capacitor 59 | .001 Microfarad |
| Capacitor 60 | .001 Microfarad |
| Capacitor 65 | .001 Microfarad |
| Capacitor 71 | .05 Microfarad |

-continued

| | |
|---|---|
| Resistor 78 | 1.8 Kilohms |

In the circuit depicted in FIG. 10, the following values were found to be acceptable in accordance with a testing of the invention:

| | |
|---|---|
| Resistor 77 | 4.7 Kilohms |
| Resistor 84 | 1.8 Kilohms |
| Capacitor 86 | .002 Microfarad |
| Potentiometer 87 | 250 Ohms |
| Resistive heater 33 | 330 Ohms |
| SCR | Type C103A1 |

Other embodiments and modifications may be performed without departing from the spirit and scope of this invention. For example, in lieu of P-type transistors, N-type transistors may be used with a corresponding reversal of the diode 46. Other modifications may be apparent to those skilled in the art, including for example, equivalent integrated circuits.

What is claimed is:

1. A temperature setback controlling system suitable for use in a building wherein a thermostat having a room temperature sensing element is employed on a wall in a first room to sense room temperature for control of a heating system effective in said first room to maintain a thermostat selected ambient room temperature, wherein heating controls for said system including a transformer having a secondary winding for providing low voltage, 60 Hz power are located in a second room of said building, and wherein a thermostat cable coupling said thermostat in said first room to said heating controls in said second room is located at least partially within interior walls of said building, said temperature setback controlling system comprising timed control means, adapted to be coupled to said transformer winding, for modulating during selected time periods cycles of one polarity of said 60 Hz low voltage with a high frequency;

a resistive heater, adapted to be placed in proximity to said room temperature sensing element; and detector means, adapted to be coupled to said thermostat cable in said first room, for detecting said high frequency modulation during cycles of said one polarity and coupled to said resistive heater for providing current flow thereto in response to such detected modulation, whereby the ambient temperature in said first room tends to be maintained at a predetermined temperature setback during said selected time periods.

2. The temperature setback controlling system as recited in claim 1 wherein said timed control meas comprises a switch;

an electrical timer coupled to said switch so that said switch is closed during selected time periods and is opened during non-selected time periods;

an electronic oscillator circuit;

unilateral conducting means; and means coupling said switch, said oscillator circuit, and said unilateral conducting means in a serial circuit whereby said serial circuit is adapted to be coupled to said transformer secondary winding.

3. The temperature setback controlling system as recited in claim 2 wherein said electronic oscillator circuit comprises a multivibrator having an output terminal; and an amplifier having an input terminal coupled to said output terminal.

4. The temperature setback controlling system as recited in claim 2 wherein said detector means comprises a manual switch having a pair of terminals, one terminal of said manual switch being adapted to be coupled to said thermostat cable, the other terminal being coupled to a first junction point;

a silicon controlled rectifier having an anode, a cathode, and a gate electrode, said cathode being adapted to be coupled to said thermostat cable;

a serially connected resistor and a light emitting diode serially coupling said first junction point to said anode, said diode being oriented so that its direction of conductivity is in the same direction as said rectifier;

a capacitor coupled across said anode and said gate electrode;

a second resistor coupled across said cathode and said gate electrode;

a variable potentiometer coupling a second junction point to said anode of said silicon controlled rectifier; and means for coupling said junction points to said resistive heater.

5. The temperature setback controlling system as recited in claim 1 wherein said detector means comprises a manual switch having a pair of terminals, one terminal of said manual switch being adapted to be coupled to said thermostat cable, the other terminal being coupled to a first junction point;

a silicon controlled rectifier having an anode, a cathode, and a gate electrode, said cathode being adapted to be coupled to said thermostat cable;

a serially connected resistor and a light emitting diode serially coupling said first junction point to said anode, said diode being oriented so that its direction of conductivity is in the same direction as said rectifier;

a capacitor coupled across said anode and said gate electrode;

a second resistor coupled across said cathode and said gate electrode;

a variable potentiometer coupling a second junction point to said anode of said silicon controlled rectifier; and means for coupling said junction points to said resistive heater.

6. A temperature setback controlling system suitable for use in a building wherein a thermostat having a room temperature sensing element is employed on a wall in a first room to sense room temperature for control of a heating system effective in said first room to maintain a thermostat selected ambient room temperature, wherein heating controls for said heating system including a transformer having a secondary winding for providing low voltage, 60 Hz, power are located in a second room of said building, and wherein a thermostat cable coupling said thermostat in said first room to said heating controls in said second room is located at least partially within interior walls of said building, said temperature setback controlling system comprising timed control means, adapted to be coupled to said transformer winding, for modulating during one set of selected time periods cycles of positive polarity of said 60 Hz low voltage with a high frequency, and for modulating during a second set of selected time periods cycles of negative polarity of said 60 Hz low voltage with a high frequency;

a first resistive heater and a second resistive heater, each adapted to be placed in proximity to said room temperature sensing element; and detector means, adapted to be coupled to said thermostat cable in said first room, for detecting said high frequency modulatings and coupled to said resistive heaters for providing current flow to said first heater in response to detected modulation during cycles of said positive polarity and for providing current flow to said second heater in response to detected modulation during cycles of said negative polarity, whereby the ambient temperature in said first room tends to be maintained at a first predetermined temperature setback during said one set of selected time periods and at a second predetermined temperature setback during said second set of selected time periods, and, whereby, during those intervals when said one set and said second set of time periods overlap, the ambient room temperature in said first room tends to be maintained at a third predetermined temperature setback.

7. The temperature setback controlling system as recited in claim 6 wherein said timed control means comprises
a first switch;
a second switch;
electrical timing means coupled to said switches so that said first switch is closed during said one set of selected time periods and is otherwise normally opened, and so that said second switch is closed during said second set of selected time periods and is otherwise normally opened;
a first electronic oscillator circuit;
first unilateral conducting means;
a second electronic oscillator circuit;
second unilateral conducting means;
means coupling said first switch, said first oscillator circuit; and said first unilateral conducting means in a first serial circuit;
means coupling said second switch, said second oscillator circuit, and said second unilateral conducting means in a second serial circuit; and
means for coupling said serial circuits in an opposing shunt relation whereby the resulting shunt circuit is adapted to be coupled to said transformer secondary winding.

8. The temperature setback controlling system as recited in claim 7 wherein at least one of said electronic oscillator circuits comprises
a multivibrator having an output terminal; and
an amplifier having an input terminal coupled to said output terminal.

9. The temperature setback controlling system as recited in claim 7 wherein said detector means comprises
a first silicon controlled rectifier having an anode, a cathode, and a gate electrode;
a second silicon controlled rectifier having an anode, a cathode, and a gate electrode;
a first serially connected resistor and a first light emitting diode serially coupled to said anode of said first silicon controlled rectifier;
a second serially connected resistor and a second light emitting diode serially coupled to said anode of said second silicon controlled rectifier;
a first capacitor coupled across said first anode and said first gate electrode;
a second capacitor coupled across second anode and said second gate electrode;
a third resistor coupled across said first cathode and said first gate electrode;
a fourth resistor coupled across said second cathode and said second gate electrode;
a first variable potentiometer having a first terminal, and having a second terminal coupled to said first anode;
a second variable potentiometer having a first terminal, and having a second terminal coupled to said second anode;
means for coupling said first terminal of said first potentiometer, and said second cathode, to said first resistive heater;
means for coupling said first terminal of said second potentiometer, and said first cathode, to said second resistive heater;
a pair of leads adapted to be coupled to said thermostat cable;
means for coupling said first resistor and said second cathode to a first of said leads;
means for coupling said second resistor and said first cathode to a second of said leads; and
a manual switch in circuit with one of said leads.

10. The temperature setback controlling system as recited in claim 6 wherein said detector means comprises
a first silicon controlled rectifier having an anode, a cathode, and a gate electrode;
a second silicon controlled rectifier having an anode, a cathode, and a gate electrode;
a first serially connected resistor and a first light emitting diode serially coupled to said anode of said first silicon controlled rectifier;
a second serially connected resistor and a second light emitting diode serially coupled to said anode of said second silicon controlled rectifier;
a first capacitor coupled across said first anode and said first gate electrode;
a second capacitor coupled across second anode and said second gate electrode;
a third resistor coupled across said first cathode and said first gate electrode;
a fourth resistor coupled across said second cathode and said second gate electrode;
a first variable potentiometer having a first terminal, and having a second terminal coupled to said first anode;
a second variable potentiometer having a first termi­nal, and having a second terminal coupled to said second anode;
means for coupling said first terminal of said first potentiometer, and said second cathode, to said first resistive heater;
means for coupling said first terminal of said second potentiometer, and said first cathode, to said second resistive heater;
a pair of leads adapted to be coupled to said thermostt cable;
means for coupling said first resistor and said second cathode to a first of said leads;

means for coupling said second resistor and said first cathode to a second of said leads; and a manual switch in circuit with one of said leads.

11. A temperature setback controlling system suitable for use in a building wherein a thermostat having a room temperature sensing element is employed on a wall in a first room to sense room temperature for control of a heating system effective in said first room to maintain a thermostat selected ambient room temperature in said first room, wherein another thermostat having a room temperature sensing element is employed on a wall in a second room to sense room temperature for control of said heating system effective in said second room to maintain a thermostat selected ambient room temperature in said second room, wherein heating controls for said heating system including a transformer having a secondary winding for providing low voltage, 60 Hz, power are located in a third room of said building, and wherein thermostat cables coupling said thermostats to said heating controls are located at least partially within interior walls of said building, said temperature setback controlling system comprising timed control means, adapted to be coupled to said transformer winding, for modulating during selected time periods cycles of one polarity of said 60 Hz low voltage with a high frequency;

a first resistive heater, adapted to be placed in proximity to said first room, room temperature sensing element;

a second resistive heater, adapted to be placed in proximity to said second room, room temperature sensing element;

first detector means, adapted to be coupled to said thermostat cable in said first room, for detecting said high frequency modulation during cycles of said one polarity and coupled to said first resistive heater for providing current flow thereto in response to suce detected modulation, whereby the ambient temperature in said first room tends to be maintained at a predetermined temperature setback during said selected time periods; and second detector means, adapted to be coupled to said thermostat cable in said second room, for detecting said high frequency modulation during cycles of said one polarity and coupled to said second resistive heater for providing current flow thereto in response to such detected modulation, whereby the ambient temperature in said second room tends to be maintained at a predetermined temperaure setback during said selected time periods.

12. The temperature setback controlling system as recited in claim 11 wherein said timed control means comprises a switch;

an electrical timer coupled to said switch so that said switch is closed during said selected time periods and is opened during non-selected time periods;

an electronic oscillator circuit;

unilateral conducting means; and means coupling said switch, said oscillator circuit, and said unilateral conducting means in a serial circuit whereby said serial circuit is adapted to be coupled to said transformer secondary winding.

13. The temperature setback controlling system as recited in claim 12 wherein said electronic oscillator circuit comprises a multivibrator having an output terminal; and an amplifier having an input terminal coupled to said output terminal.

14. The temperature setback controlling system as recited in claim 12 wherein one of said detector means comprises a manual switch having a pair of terminals, one terminal of said manual switch being adapted to be coupled to said thermostat cable, the other terminal being coupled to a first junction point;

a silicon controlled rectifier having an anode, a cathode, and a gate electrode, said cathode being adapted to be coupled to said thermostat cable;

a serially connected resistor and a light emitting diode serially coupling said first junction point to said anode, said diode being poled so that its direction of conductivity is in the same direction as said rectifier;

a capacitor coupled across said anode and said gate electrode;

a second resistor coupled across said cathode and said gate electrode;

a variable potentiometer coupling a second junction point to said anode of said silicon controlled rectifier; and means for coupling said junction points to said resistive heater.

15. The temperature setback controlling system as recited in claim 11 wherein one of said detector means commprises a manual switch having a pair of terminals, one terminal of said manual switch being adapted to be coupled to said thermostat cable, the other terminal being coupled to a first junction point;

a silicon controlled rectifier having an anode, a cathode, and a gate electrode, said cathode being adapted to be coupled to said thermostat cable;

a serially connected resistor and a light emitting diode serially coupling said first junction point to said anode, said diode being poled so that its direction of conductivity is in the same direction as said rectifier;

a capacitor coupled across said anode and said gate electrode;

a second resistor coupled across said cathode and said gate electrode;

a variable potentiometer coupling a second junction point to said anode of said silicon controlled rectifier; and means for coupling said junction points to said resistive heater.

16. A temperature setback controlling system suitable for use in a building wherein a thermostat having a room temperature sensing element is employed on a wall in a first room to sense room temperature for control of a heating system effective in said first room to maintain a thermostat selected ambient room temperature in said first room, wherein another thermostat having a room temperature sensing element is employed on a wall in a second room to sense room temperature for control of said heating system effective in said second room to maintain a thermostat selected ambient room temperature in said second room, wherein heating controls for said heating system including a transformer having a secondary winding for providing low voltage 60 Hz power are located in a third room of said building, and wherein thermostat cables coupling said thermostats to said heating controls are located at least partially within interior walls of said building, said temperature setback controlling system comprising timed control means, adapted to be coupled to said transformer winding, for modulating during one set of selected time periods cycles of positive polarity of said 60 Hz low voltage with a high frequency, and for modulating during a second set of selected time periods cycles of negative polarity of said 60 Hz low voltage with a high frequency;

a first resistive heater, adapted to be placed in proximity to said first room, room temperature sensing element;

a second resistive heater, adapted to be placed in proximity to said second room, room temperature sensing element;

first detector means, adapted to be coupled to said thermostat cable in said first room, for detecting said high frequency modulation during cycles of said positive polarity and coupled to said first resistive heater for providing current flow thereto in response to such detected modulation, whereby the ambient temperature in said first room tends to be maintained at a predetermined temperature setback during said one set of selected time periods; and second detector means, adapted to be coupled to said thermostat cable in said second room, for detecting said high frequency modulation during cycles of said negative polarity and coupled to said second resistive heater for providing current flow thereto in response to such detected modulation, whereby the ambient temperature in said second room tends to be maintained at a predetermined temperature setback during said second set of selected time periods.

17. The temperature setback controlling system as recited in claim 16 wherein said timed control means comprises a first switch;
a second switch;
electrical timing means coupled to said switches so that said first switch is closed during said one set of selected time periods and is otherwise normally opened, and so that said second switch is closed during said second set of selected time periods and is otherwise normally opened;
a first electronic oscillator circuit;
first unilateral conducting means;
a second electronic oscillator circuit;
second unilateral conducting means;
means coupling said first switch, said first oscillator circuit, and said first unilateral conducting means in a first serial circuit;
means coupling said second switch, and second oscillator circuit, and said second unilateral conducting means in a second serial circuit; and
means for coupling said serial circuits in an opposing shunt relation whereby the resulting shunt circuit is adapted to be coupled to said transformer secondary winding.

18. The temperature setback controlling system as recited in claim 17 wherein at least one of said electronic oscillator circuits comprises a multivibrator having an output terminal; and
an amplifier having an input terminal coupled to said output terminal.

19. In combination, a resistive heater, adapted to be placed in proximity to a room temperature sensing element of a thermostat employed in a wall of a room; and detector means, adapted to be coupled to a thermostat cable which engages with said thermostat, for detecting high frequency modulation during cycles of one polarity on said cable, and coupled to said resistive heater for providing current flow thereto in response to such detected modulation;

whereby the ambient room temperature in said room tends to be maintained at a predetermined temperature setback during time periods of such detected modulation.

20. A method of temperature setback control suitable for use in a building wherein a thermostat having a room temperature sensing element is employed on a wall in a first room to sense room temperature for control of a heating system effective in said first room to maintain a thermostat selected ambient room temperature, wherein heating controls for said system including a transformer having a secondary winding for providing low voltage, 60 Hz, power are located in a second room of said building, and wherein a thermostat cable coupling said thermostat in said first room to said heating controls in said second room is located at least partially within interior walls of said building, said method comprising modulating cycles of one polarity of said low 60 Hz voltage with a high frequency during selected time periods;
detecting, at said thermostat cable in said first room, said high frequency modulation; and
applying heat to said room temperature sensing element in response to such detected modulation.

21. A method of temperature setback control suitable for use in a building wherein a thermostat having a room temperature sensing element is employed on a wall in a first room to sense room temperature for control of a heating system effective in said first room to maintain a thermostat selected ambient room temperature in said first room, wherein another thermostat having a room temperature sensing element is employed on a wall in a second room to sense room temperature for control of said heating system effective in said second room to maintain a thermostat selected ambient room temperature in said second room, wherein heating controls for said heating system including a transformer having a secondary winding for providing low voltage 60 Hz power are located in a third room of said building, and wherein thermostat cables coupling said thermostats to said heating controls are located at least partially within interior walls of said building, said method comprising modulating cycles of positive polarity of said low 60 Hz voltage with a high frequency during one set of selected time periods, and modulating cycles of negative polarity of said low 60 Hz voltage with a high frequency during a second set of selected time periods;
detecting, at said thermostat cable in said first room, said modulation during cycles of said positive polarity;
applying heat to said first room, room temperature sensing element in response to such detected modulation;
detecting, at said thermostat cable in said second room, said modulation during cycles of said negative polarity; and
applying heat to said second room, room temperature sensing elements in response to such detected modulation during cycles of said negative polarity.

* * * * *